Figure 1:
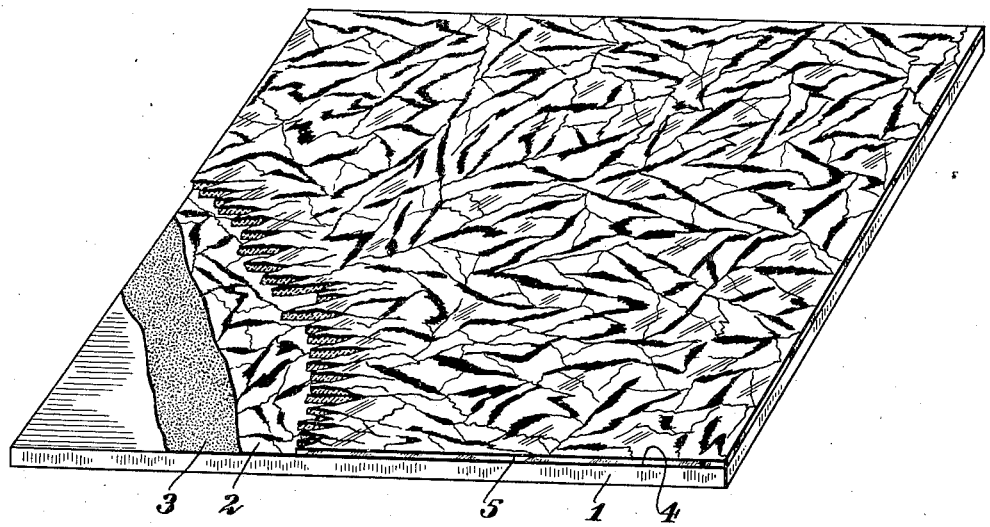

Aug. 14, 1934.　　　J. C. MacILDOWIE　　　1,970,328
PREFORMED STRUCTURAL UNIT AND METHOD OF MAKING THE SAME
Filed April 24, 1933

INVENTOR
John C. Mac Ildowie.
BY D. N. Halstead
ATTORNEY

Patented Aug. 14, 1934

1,970,328

UNITED STATES PATENT OFFICE 1,970,328

PREFORMED STRUCTURAL UNIT AND METHOD OF MAKING THE SAME

John C. MacIldowie, Nashua, N. H., assignor to Johns-Manville Corporation, New York, N. Y., a corporation of New York Application April 24, 1933, Serial No. 667,680

15 Claims. (Cl. 154—2)

This invention relates to a preformed structural unit and a method of making the same. The invention pertains especially to a panel with a decorative film adhered thereto and a transparent facing element of glass or the like adhered to the said film, in such manner as to protect the film against abrasion and the action of moisture.

There is known a method of making a panel, for interior use, comprising a rigid backing sheet of asbestos and Portland cement composition, in compressed and then hardened condition, and a decorative film applied to the surface thereof. The decorative film may contain a large proportion of vegetable drying oil and may resemble a paint somewhat in composition. Furthermore, the decorative layer may be provided with a mottled or figured appearance resembling that of a natural product such as marble.

When it is attempted to use such marbleized panels out-of-doors, it is found that the marbleizing film may become scratched, marred, or loosened from the backing sheet. In this loosening action, the effect of moisture is frequently important. Thus, moisture may decrease the effectiveness of the adhesive used to adhere the decorative film to the backing sheet or may dissolve lime present in hydrated Portland cement, cause migration of the lime to the surface of the backing sheet and thereby lead to undesired and disturbing reaction between the lime and the adhesive or the decorative film itself.

It is an object of the present invention to overcome these disadvantages in marbleized panels. Other objects and advantages will appear as the description of the invention progresses.

Briefly stated, the invention comprises the following features: a structural unit comprising a sheet of a compressed and hardened composition of asbestos and hydrated Portland cement, a preformed sheet of decorative material, and a lime-resistant adhesive adhering the decorative material to the sheet of asbestos and Portland cement; a preformed structural unit comprising a glass sheet facing element, a sheet backing element, say a rigid backing sheet of coefficient of thermal expansion different from that of glass, and a yieldable intermediate layer adhered on the one side to the facing element and on the other side to the backing sheet; a structure of the type described, including, as the intermediate layer, a marbleizing film of conventional type and particularly such a structure in which the marbleizing film is adhered to a backing sheet of asbestos and Portland cement by means of a water and lime resistant adhesive; and/or the hereinafter described method of making such products.

Figure 2:
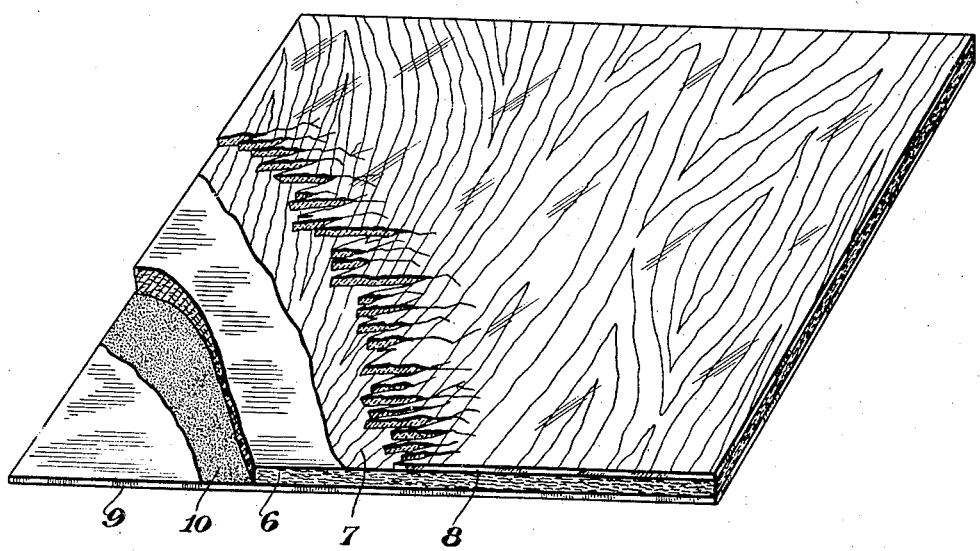

The invention is illustrated in the attached drawing in which:

Fig. 1 shows a perspective view of the preferred embodiment of the invention, with parts broken away for clearness of illustration; and Fig. 2 shows a similar view of a modification of the invention.

There are shown a rigid backing sheet 1, an intermediate yieldable layer 2, provided on the side adjacent to the backing element with an adhesive 3 and on the other side with an adhesive 4, and a glass sheet facing element 5 adhered by means of the adhesive 4 to the said intermediate layer.

The intermediate layer is suitably a so-called marbleizing film provided with figurations resembling, in appearance, polished marble. Such a film may contain a large proportion of a paint oil, suitable pigments, and other ingredients, and may be made and applied to the backing sheet as described in U. S. Patent 1,832,531 issued to Close on November 17, 1931, with the exception that the adhesive used to secure the decorative marbleizing film to the backing is one that is resistant to water and alkalies such as lime.

Such an adhesive may consist of vinylite resin (a polymerization product of vinyl derivatives such as vinyl chloride or acetate) or a resinous phenol-aldehyde condensation product such as bakelite. The same adhesive may be used on both sides of the decorative film. In cases where resistance to alkali to a high degree is not essential, the adhesives may be a resinous glyceryl phthalate of the type sold under the name of Glyptal.

The backing sheet may be a stone-like material, suitably one containing a hydraulic cementitious material, such as the dense, strong, asbestos and Portland cement composition previously referred to. In such a composition containing hydrated Portland cement, lime is present. Although the backing sheet has a coefficient of expansion that is different from that of glass, the yieldable intermediate film allows the facing and backing sheets to expand or contract unequally without causing cracking or parting of the assembled composite.

In the modification illustrated in Fig. 2, the intermediate layer may comprise porous, fibrous material, such as paper and/or a fiber board.

There is illustrated a structure comprising a lightweight, thermal insulating fiber board 6, with a layer of decorative material 7, adhered on one side thereto and adhered on the other side to the glass facing sheet 8. The decorative film illustrated resembles wood veneer in appearance and consists of paper appropriately printed, intimately associated, as by impregnation, with adhesive material, suitably in solution in a volatile solvent, and then assembled in a composite in such manner as to adhere the glass to the fiber board. In such a structure, the paper and adhesive associated therewith adhere the glass substantially continuously to the lightweight board. To strengthen the structure, there is provided a rigid stone-like backing element 9 that is suitably of the type illustrated in Fig. 1. This backing sheet is adhered to the fiber board by means of the layer 10 of suitable adhesive material.

In an article of the type described the glass face serves as adequate protection for the relatively soft and yieldable decorative film. The glass is permanent and not subject to deterioration on exposure to sun or weather, in distinction from a transparent lacquer film, for example. The glass prevents scarring of the decorative film and prevents the entrance of moisture through the face of the unit. Furthermore, the glass gives a polished surface to the whole, the appearance of depth to the decorative finish, and makes possible the washing or cleaning of the face of the unit in convenient manner and without injury. In the modification illustrated in Fig. 2, these same functions are served. In addition, the lightweight thermal insulating material represented by the fiber board greatly increases the insulating power, decreases the weight per unit of area and thickness, and, during fabrication, minimizes the danger of breakage due to unevenness of surface of the rigid elements 8 and 9.

When more complete sealing against moisture is desired, the backing element, such as that of asbestos and Portland cement, may be thoroughly impregnated under pressure with a waterproofing agent of the type of boiled linseed oil.

The method of manufacturing the improved units of the present invention comprises adhering the decorative film or the yieldable intermediate layer on one side to the face of the stone-like backing element and on the other side to the glass facing sheet. The assembly is preferably made at an elevated temperature under conditions which cause the adhesive associated with the intermediate layer to be in a soft condition and then causing the adhesive to assume a hardened or set condition before the pressure is released.

The adhesive is suitaby thermoplastic, that is, adapted to be softened by heat or is adapted to be applied in solution in a volatile solvent. The adhesive is also one that is adapted to be hardened, as, for example, by cooling the adhesive from the heat-softened condition, by evaporation of solvent, or, preferably, by maintaining the adhesive at an elevated temperature to cause additional polymerization of a polymerizable adhesive to a relatively hard or set form.

There are first provided the packing sheets and the facing elements of suitable size and preferably with substantially plane surfaces. There is also provided a decorative sheet, as, for example, a film suitable for application by the decalcomania or transfer process, as described in the said patent to Close. The sheet is adhered by an adhesive, of the type described, to a backing sheet. With the decalcomania or transfer process, there is used a decorative film provided over its back with a paper support adhered thereto by means of a water-soluble adhesive. The exposed face of the film is applied to the backing sheet, previously coated with a suitable adhesive, say in sheet form or in solution, and pressed thereagainst to give good adhesion. Then the paper is removed from the back of the film, by solution of the water-soluble adhesive and stripping off of the thus loosened paper.

When this adhesive and paper have been removed from the decorative film, the film may be dried and then coated with an adhesive of type suitable for use in adhering the decorative film to a glass facing sheet. Such an adhesive is one of the type previously described and may be used in a form that is softened by solvent or adapted to be softened at an elevated temperature. Finally, the glass plate is placed over this layer of adhesive and the whole assembly or composite thus made is subjected to compression at an elevated temperature. Thus, the compression may be made at a pressure of 50-150 pounds per square inch and at a temperature corresponding to steam at a gauge pressure of 80 pounds.

During this treatment the adhesive is softened and caused to distribute itself, over the surfaces of the components being united, in such manner as to equalize irregularities therein without causing breakage of the glass. Volatile solvent, if present, is evaporated. If the adhesive used is one that is adapted to be hardened by cooling, the assembly, while still under compression, may be allowed to cool to harden the adhesive. If the adhesive is one that is polymerizable and preferably hardened by additional polymerization at an elevated temperature, then treatment at the elevated temperature is continued until the adhesive is hardened to a satisfactory degree. The assembly may then be removed from the source of compression.

The backing sheet of asbestos and Portland cement has a surface adapted to permit a satisfactory footing or anchorage of the adhesive therein under pressure. By the treatment described, the adhesive not only is given a satisfactory footing but also is hardened in situ.

The details that have been given are for the purpose of illustration and not restriction. Many variations therefrom may be made within the scope of the appended claims.

What I claim is:

1. A preformed structural unit comprising a facing sheet of glass, a backing sheet of stone-like material, and a layer of yieldable material disposed between the said sheets and adhered to them, to form a unitary article.

2. A preformed structural unit comprising a backing sheet of a compressed and hardened composition of asbestos and Portland cement, a waterproof material impregnated thereinto, a yieldable sheet adhered on one side to the backing sheet, and a transparent, permanent, water-impermeable facing and protective sheet adhered to the other side of the yieldable sheet.

3. A preformed structural unit comprising a backing sheet of a compressed and hardened composition of asbestos and Portland cement, a decorative, yieldable sheet adhered on one side thereto, and a glass sheet adhered to the other side of the decorative sheet.

4. A preformed structural unit comprising a backing sheet of a compressed and hardened composition of asbestos and Portland cement, a decorative, yieldable sheet, containing a paint oil and resembling marble in figuration, adhered on one side thereto, and a transparent, permanent, water-impermeable facing and protective sheet adhered to the other side of the decorative sheet.

5. A preformed structural unit comprising a backing sheet of a compressed and hardened composition of asbestos and Portland cement, a decorative, yieldable sheet adhered on one side thereto, and a glass sheet adhered to the other side of the decorative sheet, the decorative sheet being provided on its two sides wth an adhesive.

6. A preformed structural unit comprising a backing sheet of a compressed and hardened composition of asbestos and Portland cement, a decorative, yieldable sheet adhered on one side thereto, and a glass sheet adhered to the other side of the decorative sheet, the decorative sheet being provided on its side adjacent to the backing sheet with a lime and water resistant adhesive.

7. A preformed structural unit comprising a backing sheet of a compressed and hardened composition of asbestos and Portland cement, a decorative, yieldable sheet adhered on one side thereto, and a glass sheet adhered to the other side of the decorative sheet, the decorative sheet being provided on its side adjacent to the backing sheet with a vinylite resin adhesive.

8. A preformed structural unit comprising a backing sheet of rigid stone-like material, a glass facing sheet, a yieldable core sheet of felted fibrous material disposed therebetween, and a thermoplastic adhesive disposed over the face and back of the core sheet and adhering the several sheets into a unitary article.

9. A preformed structural unit comprising a lightweight sheet of thermal insulating material and a glass facing element substantially continuously adhered thereto.

10. A preformed structural unit comprising a glass sheet facing element, a rigid backing sheet of coefficient of thermal expansion different from that of glass, an intermediate porous sheet, and adhesive associated with the porous sheet and adhering the several sheets into a unitary article.

11. In making a durable preformed structural unit, including a composite of a facing sheet of glass and a backing sheet of asbestos and Portland cement, in compressed and hardened condition, the method which comprises applying to the rigid backing sheet an adhesive material adapted to be softened and then hardened, applying a sheet of glass to the exposed face of the adhesive in softened condition, compressing the assembly, to form a unitary article and give the adhesive a footing in the backing sheet, and causing the adhesive to harden in situ while maintaining the composite in compressed condition.

12. In making a durable preformed structural unit, including a composite of a facing sheet of glass and a backing sheet of asbestos and Portland cement, in compressed and hardened condition, the method which comprises applying to the rigid backing sheet an adhesive material adapted to be softened and then hardened by heating, applying a sheet of glass to the exposed face of the adhesive, subjecting the composite to treatment at an elevated temperature and an elevated pressure and continuing the treatment, to soften the adhesive, unite integrally the facing and backing sheets, and cause the adhesive finally to harden.

13. In making a glass-protected marbleized panel, the method which comprises applying a lime resistant adhesive to a sheet of asbestos and Portland cement, in compressed and hardened condition, applying over the adhesive a suitable flexible decorative film adapted to be adhered to the adhesive, applying a coating of adhesive over the exposed face of the film, placing a facing sheet of glass over the said coating on the face of the film, pressing the assembly together, at an elevated temperature, and cooling the resulting unitary article.

14. In making a glass-protected marbleized panel, the method which comprises applying a lime resistant adhesive to a sheet of asbestos and Portland cement, in compressed and hardened condition, applying over the adhesive a suitable flexible decorative film adapted to be adhered to the adhesive, applying a coating of adhesive over the exposed face of the film, placing a facing sheet of glass over the said coating on the face of the film, pressing the assembly together, at an elevated temperature, cooling the resulting unitary article under pressure, and then releasing the pressure.

15. A structural unit comprising a preformed backing sheet of a compressed and hardened composition of asbestos and hydrated Portland cement, a preformed sheet of decorative material, and a lime-resistant adhesive adhering the sheet of decorative material to the backing sheet.

JOHN C. MacILDOWIE.